June 17, 1930. A. IDONAS ET AL 1,764,872
COFFEE ROASTER
Filed April 4, 1928
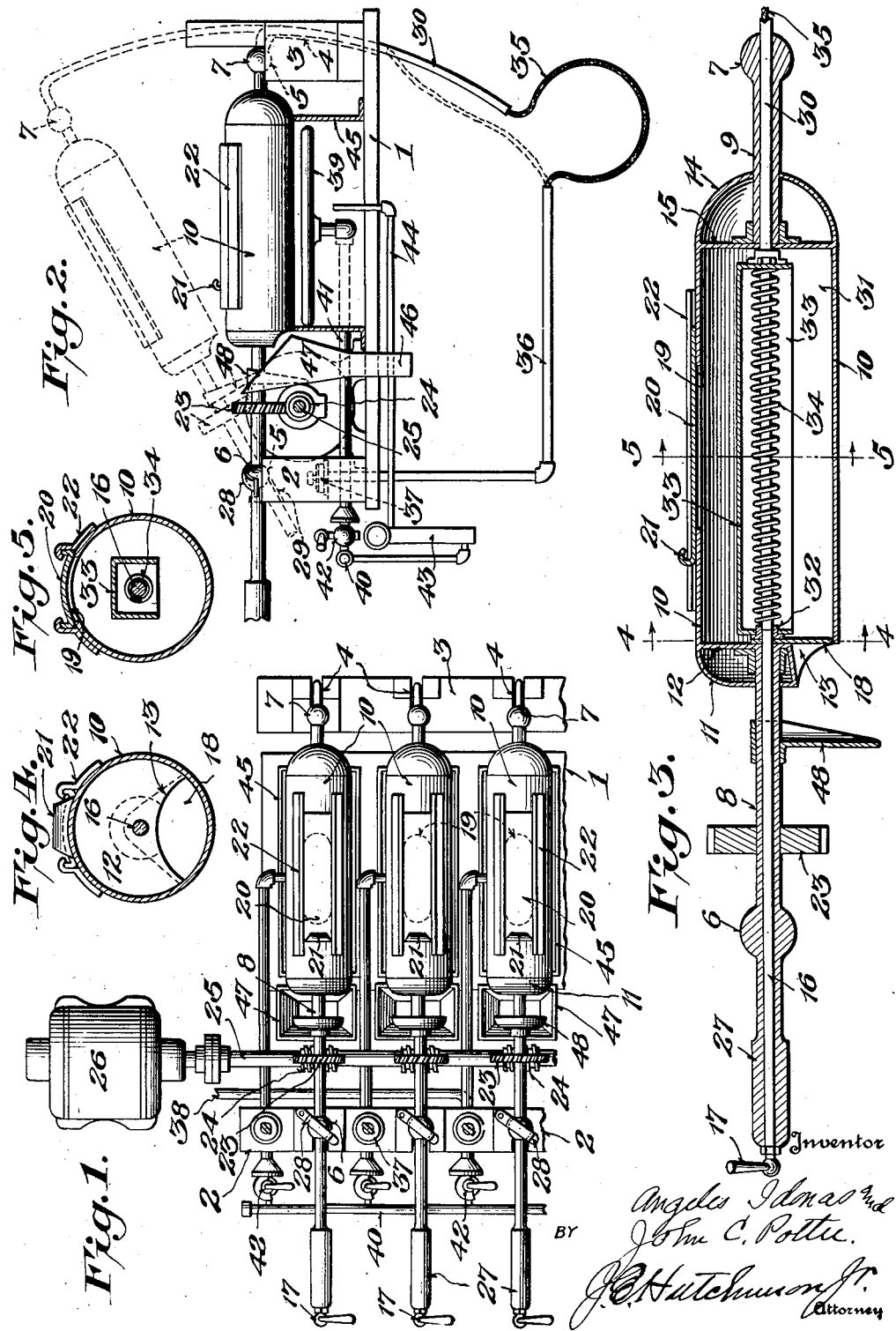

Patented June 17, 1930

1,764,872

UNITED STATES PATENT OFFICE

ANGELES IDONAS, OF ORANGE, AND JOHN C. POTTER, OF WEST ORANGE, NEW JERSEY

COFFEE ROASTER

Application filed April 4, 1928. Serial No. 267,193.

This invention relates to a device which is broadly classified as a drier, but the structure here disclosed is essentially designed for roasting coffee in small quantities although it will, of course, be understood that peanuts or any other character of nut or grain might be readily treated with this device and we therefore do not wish to be limited in any way to a coffee roaster. It is also conceivable that the device might be conveniently used for popping corn, puffing wheat, or rice, or any other dehydrating operation.

The present machine has been conceived and designed with a view to roasting small batches or lots of coffee for the retail trade, so that when a customer requests a pound of coffee of any particular grade, the storekeeper may in a minimum length of time, roast a pound of the green bean, grind and deliver the coffee to the customer. The customer thereby secures freshly roasted coffee in only a slightly longer period of time than is normally required for packing and grinding previously roasted, and possibly stale, coffee.

Another object of the invention is to arrange a plurality of such roasting units on a common base so that more than one lot of coffee may be roasted at the same time, for different or the same customer, and while we have shown three of such roasting units mounted upon a base, the base in Fig. 1 has been broken away so as to clearly indicate that other units of a similar type may be employed.

In the majority of coffee and peanut roasters a rotating drum subjected to either external or internal heat is employed and the time required for completely roasting either coffee or peanuts consumes more than the average customer cares to spend in waiting for what has been requested. It is, therefore, another object of this invention to provide a device having both external and internal heat so that the roasting of the particular product being treated is expedited to the maximum, and a pound of coffee or an equal quantity of peanuts may be roasted within the minimum period of time so that a customer requesting, for instance, a pound of coffee could be furnished with the same without any such delay as would cause material annoyance or displeasure.

Still another object of this invention is the provision of a machine embodying a plurality of rotating roasting drums all associated with a common driving motor in such manner that when in operative position they will be geared to and driven by the motor, and when elevated to dump the contents, are disconnected, and in which each roasting unit is separately driven and capable of being disconnected from the driving motor independently of all other units.

Still another object of the invention resides in providing each drum with a closing door which rotates with the drum and an operating member for the door also rotating with the drum and independently thereof, so that the door may be thrown to closed or open position at any time.

Further objects of the invention will appear as the following specific description is read in connection with the accompanying drawing which forms a part of this application, and in which Fig. 1 is a top plan view showing a more or less diagrammatic illustration of the machine with three units illustrated;

Fig. 2 is a side elevation showing one of the units in elevated dumping position;

Fig. 3 is a longitudinal sectional view taken through one of the units; and

Figs. 4 and 5 are cross sectional views taken respectively on the lines 4—4 and 5—5 of Fig. 3, both looking in the direction of the arrows.

Referring more particularly to the drawing, 1 represents a suitable platform or base which may be supported upon a table or other raised platform or may be carried upon legs so that the roasting unit will be arranged at an elevation convenient to the operator. Secured to the base adjacent opposite edges thereof are bearing supports or blocks 2 and 3, the latter of which is provided with a plurality of vertically arranged slots 4 for a purpose to be hereinafter described, and each of the blocks 2 and 3 is provided with a plurality of sockets 5 to receive the ball-shaped bearing members 6 and 7. These ball-shaped bearing members are carried by the shafts 8 and 9, the former projecting from and secured to the front end of a roasting drum 10 and the latter secured to the rear end of the unit as shown in Fig. 3.

The shaft 8 passes though the front wall 11 of the unit and is secured in any appropriate manner, such for instance as by welding, to a partition 12. Both the front wall 11 and the partition 12 are cut away as shown in Figs. 3 and 4 to provide a discharge opening 13, which will be more particularly described hereinafter.

The shaft 9 of the heating unit is secured to the rear end 14 in a similar manner, that is by passing through the end wall 14 and being coupled to the partition 15, by welding or in any other suitable manner.

Each of the shafts 8 and 9 are hollow as shown, and passing through the shaft 8 is a shaft 16 which has secured to its outer end an operating handle 17 and to its inner end the door or closure member 18. This closure member is substantially arcuate in shape having its outer marginal edge closely fitting the inner wall of the drum 10 and is of such angularity as to completely close the opening 13 when arranged in the position shown in Fig. 3.

Each of the drums is provided with a filling opening 19 which is closed by a sliding door 20 having a handle 21 and sliding in cleats 22 secured to the drum upon opposite sides of the opening 19.

Each shaft 8 has secured thereto a suitable worm gear 23 adapted to mesh with a worm 24 on the motor shaft 25 which is coupled as is shown to the driving motor 26. The motor shaft 25 extends entirely across the machine and has a sufficient number of worms 24 to mesh with the corresponding gears 23 of all of the units, be the number large or small, so that if all of the drums are in the position in full lines in Fig. 2 they will all be driven simultaneously from the one motor, but when the drums are elevated to the position shown in dotted lines, the gears 23 will be disconnected from the worms 24 thereby stopping rotation of that particular drum and permitting the dumping of the contents.

As shown in Figs. 1 and 3 each of the shafts 8 is formed at its outer end with an enlargement 27 constituting a handle by which the drum may be tilted to the position shown in dotted lines in Fig. 2 and also rotated independently of the driving gear. This handle is provided particularly for tilting the drum to the dotted line position of Fig. 2 but it will be readily understood that when so elevated it is desirable to have the opening 13 arranged at the bottom of the drum for dumping the contents and the handle 27 can therefore be utilized and is utilized to turn the drum into this position when necessary.

In the present construction the drums and their corelated shafts have sufficient weight to hold the ball-shaped bearing members within the socket 5, but we preferably provide resilient retaining members 28 pivoted adjacent the sockets 5 on the bearing block 2, which when sprung over the balls 6 serve to retain these parts in the sockets when the drums are tilted to the position shown in dotted lines in Fig. 2. As also shown the block 2 is provided adjacent the sockets 5 with slots 29 which permits the tilting of the shafts 8 as shown.

As before stated the shaft 9 of each drum is hollow and such a shaft is provided for the purpose of permitting the passage of the cable housing 30, which is in the form of a rigid pipe and which extends into the roasting chamber 31 of the drum on the axis thereof, and has its free terminal end journalled in a bearing 32 carried on the outer end of the shaft 8.

Mounted upon this pipe 30 within the chamber 31 is a housing 33 which is substantially U-shaped in cross section and within the housing there is wound around the pipe and suitably insulated therefrom a heating element 34 which is connected in any suitable manner (not shown) to the electrical conductors 35 led into the housing 33 through the pipe 30.

That portion of the pipe 30 which extends beyond the end of the shaft 9 is bent downwardly on the arc of a circle of which the ball 6 is the center, and extended through the slot 4 in the bearing block 3 which at all times guides the pipe 30 and prevents the same from rotating with the drum and shafts 8 and 9. It will therefore be seen that when the drum is rotated through the motor and gearing 23, 24, the housing 33 and its associated heating element 34 remains stationary and the housing being open at its bottom, the heat admitted from the resistance coil 34 will be always directed downwardly upon the material which as is of course understood, is lying at the lowest level in the drum 10.

The cable 34 is provided with a loop 35 which permits of the elevation of the pipe 30 and extends through another housing or pipe 36 to a switch 37 and all of the switches for the several units are mounted upon the bearing block 2 between the sockets 5 as shown in Fig. 1. Supply current may be led into the switches in any suitable manner. We have shown diagrammatically conductors 38 for this purpose.

In order to obtain maximum controlled heat so that the material being acted upon may be roasted within the shortest period of time, we arrange beneath each drum a gas burner 39 which is connected to the supply main 40 through a pipe 41 and a shut-off valve 42, and we regulate the supply of gas to said burner by a thermostat 43 of any approved construction. The thermostat here shown has a heat-conducting tube 44 leading therefrom to a point directly beneath the burner, but this type of thermostat is not important, and any suitable thermostatic control may be employed. As shown we preferably arrange each burner in a rectangular shell 45 secured upon the upper side of the base so that the heat of the burner is not dissipated but all directed against the roasting drum.

Secured to the base at intervals are discharge chutes 46, each provided with a flared funnel-like upper end 47, and carried by each shaft 8 is a deflecting element 48 which, as shown in dotted lines in Fig. 2, is so arranged that when material is discharged from the drum through the opening 13, the deflecting member will deflect such material into the funnel 47 where it can be discharged through the chute 46 into a suitable container.

It will, of course, be understood that the funnel-like top of each chute is sufficiently wide to permit the rotation of the deflecting member without this deflecting member being brought into contact with any part of the funnel-like top.

In the operation of the device we will assume that a purchaser desires a pound of coffee. The dealer or retailer thereupon places the required amount in the drum 10 through the opening 19, while the drum is in the position shown in dotted lines in Fig. 2. The door 20 is then closed, as is also the door 18 and the drum lowered into the position shown in full lines in Fig. 2, which causes the gear 23 thereon to be brought into mesh with the corresponding worm 24, which is constantly rotating. The gas at the burner 39 may be lit by hand prior to lowering the drum or it may be lit in any suitable manner when the drum is lowered through a pilot light which is kept going continuously. The thermostat will automatically regulate the temperature at the burner 39 but the electrical heating element which may be either energized automatically or through the switch 37 develops a constant heat although it is conceivable that this heat might also be regulated. If, however, the constant heat of the electrical element is not sufficient to burn the material being treated, then the regulation of the gas burner will be sufficient.

After the coffee or other material has been properly roasted, the operator taking hold of the handle 27, and allowing it to rotate in his hand, depresses the same, thus elevating the drum and disconnecting the gears 23, 24. If the drum is in proper position with the opening 13 at its lowest point, the handle 17 may be turned and the door 18 thus opened, discharging the contents against the deflector and into the funnel-like top 47 of the chute 46. A bag may be held under the chute 46 or any other suitable receptacle, which will serve the purpose of conveying the coffee to the grinder. All of these operations, including the roasting, take place within a minimum of time and the customer therefore is not annoyed by the slight delay and is assured of obtaining a freshly roasted article.

What we claim is:—

1. In combination, a base, bearing members thereon, a plurality of rotatably mounted roasting drums mounted on said bearing members, a common driving shaft for all of said drums, gearing connecting the driving shaft and drums, and means for raising said drums and thereby disconnecting the gearing.

2. In combination, a base, bearing members mounted thereon, a plurality of roasting drums rotatably mounted upon said bearing members and each carrying a gearing, a common driving shaft extending across said base, a plurality of gears on said shaft intermeshed with the gears on the drums when the latter are in operative position, and means for raising each drum and thereby disconnecting the gear thereon with the intermeshing gear on the driving shaft.

3. The combination with a rotatable roasting drum, means to rotate the same, an external heating element arranged beneath the same, an independent internal heating element within the drum, and means for moving the drum out of the effective heating range of the external heating element and simultaneously disconnecting the rotating means.

4. The combination with a rotatable heating drum, means to rotate the same, of a gas burner and a regulating device located below the drum, an electric heating element within the drum, means for holding the latter against rotation, and means for moving the drum out of the effective heating range of the external heating element and simultaneously disconnecting the rotating means.

5. The combination with a rotatable and tiltable heating drum, an electrical heating coil arranged therein, conductors for conveying current to said coil, a conductor housing leading into said drum, and around which the drum is rotatable, and means for holding said housing against rotation in any position of the drum and thereby preventing rotation of the coil.

6. The combination with a rotatable and tiltable heating drum, an electrical heating coil arranged therein, conductors for conveying current to said coil, a conductor housing leading into said drum, and around which the drum is rotatable, and means for holding said housing against rotation in any position of the drum and thereby preventing rotation of the coil, together with a deflector carried by the housing and arranged to deflect the heat from the coil onto the material being roasted.

7. In combination, a rotatable heating drum, hollow supporting shafts therefor, said drum having a discharge opening, a door for closing said opening, and means passing through one of said shafts for controlling said door.

8. The combination with a rotatable heating drum having a discharge opening, a door for controlling said opening, hollow shafts for supporting said drum, and a shaft extending through one of said hollow shafts and rotatable with and with respect to said shaft for controlling the position of said door.

9. The combination with a rotatable heating drum having a discharge opening therein, hollow shafts for supporting said drum, a door for closing said discharge opening, a shaft extending through one of the hollow shafts for controlling the position of said door, a heating coil arranged within said drum, and a conductor housing extending through the other hollow shaft and supporting said coil, the free end of said housing being supported upon said door controlling shaft.

10. The combination with a rotatable heating drum having a discharge opening therein, hollow shafts for supporting said drum, a door for closing said discharge opening, a shaft extending through one of the hollow shafts for controlling the position of said door, a heating coil arranged within said drum, a conductor housing extending through the other hollow shaft and supporting said coil, the free end of said housing being supported upon said door controlling shaft, and a heat deflector carried by and rigid with said housing and journalled upon the door controlling shaft.

11. In combination a roasting drum having a discharge opening, a discharge chute for receiving the material discharged through said opening, supporting shafts for the drum, and means carried by one of the shafts for guiding the discharged material into the chute.

12. The combination with a rotating roasting drum having a discharge opening, and supporting shafts for said drum, of a chute for receiving the material discharged from the drum through said opening, and a guiding device carried by one of the shafts for guiding the material discharged into said chute.

13. The combination with a rotatable roasting drum having a door controlled discharge opening therein, and supporting shafts for said drum, of a chute adapted to receive the material discharged from said drum through said opening, and a guard keyed to one of the shafts and arranged in line with the axis of the discharge opening and adapted to deflect the material discharged through said opening into the chute.

14. The combination with a horizontally arranged rotatable roasting drum having a door controlled discharge opening, supporting shafts for said drum, bearings for loosely supporting said shafts and permitting the tilting of the drum to discharge the material therefrom through the end opening, of a chute associated with said drum, a guard carried by one of the shafts in line with the axis of the discharge opening for deflecting the discharged material into the chute, and means for tilting the drum to the discharge position.

In testimony whereof we affix our signatures.

ANGELES IDONAS.
JOHN C. POTTER.